United States Patent
Shachor et al.

(10) Patent No.: US 12,549,605 B2
(45) Date of Patent: Feb. 10, 2026

(54) AUTOMATED POLICY ENFORCEMENT IN NETWORKED DEVICES

(71) Applicant: Microsoft Technology Licensing, LLC, Redmond, WA (US)

(72) Inventors: Gal Asher Shachor, Yokneam Illit (IL); Meir Baruch Blachman, Jerusalem (IL); Nesia Avivi, Modiin (IL); Scott Stephen Sheehan, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 117 days.

(21) Appl. No.: 18/339,740

(22) Filed: Jun. 22, 2023

(65) Prior Publication Data

US 2024/0430304 A1  Dec. 26, 2024

(51) Int. Cl.
*H04L 29/06* (2006.01)
*H04L 9/40* (2022.01)

(52) U.S. Cl.
CPC .......... *H04L 63/20* (2013.01); *H04L 63/0254* (2013.01)

(58) Field of Classification Search
CPC ............................ H04L 63/20; H04L 63/0254
See application file for complete search history.

(56) References Cited

U.S. PATENT DOCUMENTS

| | | | |
|---|---|---|---|
| 2009/0049518 A1* | 2/2009 | Roman | H04L 41/0894 726/1 |
| 2014/0337528 A1 | 11/2014 | Walker et al. | |
| 2016/0028776 A1* | 1/2016 | Lim | H04L 63/20 726/1 |

OTHER PUBLICATIONS

International Search Report and Written Opinion received for PCT Application No. PCT/US2024/034563, Aug. 5, 2024, 09 pages.
"Chrome: The secure Browser for your Enterprise", Retrieved From: https://chromeenterprise.google/browser/security/, Retrieved Date: Mar. 23, 2023, 21 Pages.
"Citrix Enterprise Browser", Retrieved From: https://docs.citrix.com/en-US/citrix-enterprise-browser.html, Oct. 6, 2022, 2 Pages.
"Enterprise Browser Support & Downloads Zebra", Retrieved From: https://www.zebra.com/us/en/support-downloads/software/developer-tools/enterprise-browser.html, Retrieved Date: May 29, 2023, 7 Pages.
"Enterprise Web Browsers", Retrieved From: https://sourceforge.net/software/web-browsers/for-enterprise/, Retrieved Date: May 29, 2023, 17 Pages.

(Continued)

*Primary Examiner* — Wasika Nipa
(74) *Attorney, Agent, or Firm* — Barta Jones, PLLC

(57) ABSTRACT

A "hybrid" policy execution mechanism is provided herein. A hybrid policy execution server uses initial context data received from a client device is to partially execute a 'full' policy, resulting in a (simplified) local policy that can be implemented at the client device. The local policy indicates an action and associated local condition that can be evaluated locally at the client device, enabling the client device to determine whether to perform the action in response to a first trigger event without a further call to the hybrid policy execution server. In certain embodiments, the local policy may indicate a call-back condition, which triggers a call-back to the hybrid policy execution server in response to a second trigger event, e.g. with additional context that is now available to the client device. The call-back mechanism can incorporate richer policy conditions that are evaluated server-side.

20 Claims, 6 Drawing Sheets

(56) References Cited

OTHER PUBLICATIONS

"Introducing the Enterprise Browser", Retrieved From: In White Paper of Island, Jul. 2022, 10 Pages.

"Secure Enterprise Browsing Starts with Chrome", Retrieved From: https://services.google.com/fh/files/misc/chrome_browser_enterprise_secure_enterprise_browsing.pdf?_ga=2.120530447.604401025.1682199530-453736737.1682199530, Retrieved Date: Mar. 23, 2023, 2 Pages.

"Zero Trust-ready Enterprise Browser", Retrieved From: https://www.microsoft.com/en-us/edge/business/security?form=MA13FJ, Retrieved Date: Mar. 23, 2023, 8 Pages.

Kenyon, Brian, "Enterprise Browser Management—The Last Mile Challenge", Retrieved From: https://connect.island.io/hubfs/White%20Papers/Enterprise%20Browser%20for%20DLP.pdf, Retrieved Date: Mar. 23, 2023, 4 Pages.

Khalili, Joel, "This Browser You've Never Heard of is Now Worth a Billion Dollars", Retrieved From: https://www.techradar.com/news/this-browser-youve-never-heard-of-is-now-worth-a-billion-dollars, Mar. 26, 2022, 14 Pages.

Lyndersay, et al., "Microsoft Edge Security for your Business", Retrieved From: https://learn.microsoft.com/en-us/deployedge/ms-edge-security-for-business?form=MA13HW, Oct. 19, 2022, 4 Pages.

Mearian, Lucas, "Start-up Emerges with an 'Enterprise Browser'", Retrieved From: https://www.computerworld.com/article/3648597/start-up-emerges-with-an-enterprise-browser.html, Feb. 2, 2022, 8 Pages.

Thompson, et al., "Talon Launches First Corporate Secure Browser for the Hybrid Work Era Backed by Renowned Cyber Security Industry Leaders", Retrieved From: https://www.prnewswire.com/news-releases/talon-launches-first-corporate-secure-browser-for-the-hybrid-work-era-backed-by-renowned-cyber-security-industry-leaders-301394826.html, Oct. 7, 2021, 4 Pages.

Trunk, Jason, "Critical SaaS and Web Apps Make Your Business Vulnerable. Here's How We Solved That Problem", Retrieved From: https://www.island.io/blog/critical-saas-and-web-apps-make-your-business-vulnerable-heres-how-we-solved-that-problem, Apr. 26, 2022, 5 Pages.

Wesley, et al., "Understand Data Loss Prevention (DLP) in Microsoft Edge", Retrieved From: https://learn.microsoft.com/en-us/deployedge/microsoft-edge-security-dlp?form=MA13HW, Dec. 6, 2022, 3 Pages.

International Preliminary Report on Patentability (Chapter I) received for PCT Application No. PCT/US2024/034563, Jan. 2, 2026, 6 pages.

\* cited by examiner

AUTOMATED POLICY ENFORCEMENT IN NETWORKED DEVICES

TECHNICAL FIELD

The present disclosure pertains to automated policy enforcement in networked devices.

BACKGROUND

The ability to define and enforce policies is a cornerstone of modern enterprise-grade security. A policy is a collection of rules that govern access to data, data, systems or services and the like in a given context. For example, a policy may restrict or block access to certain websites or domains, or restrict certain operations (such as file download or uploads, file modification or deletion, file sharing operations, access to or usage of peripheral devices such as cameras or printers, clipboard copy actions etc.). Herein, a policy is said to be 'executed' when the policy rules are evaluated on a given set of contextual inputs. A policy may, for example, be defined or customized by an organization, and applied or enforced in relation to infrastructure, services etc. within an organization domain.

Policies can be deployed and enforced in a variety of situations. For example, in the case of network traffic routed through a proxy service, a policy may be executed at the proxy service to determine whether to block or allow a request received at the proxy service. As another example, in a cloud computing context, a policy may be executed in a back-end cloud computing system, e.g. to determine whether to block or allow an access attempt to a cloud service, or to determine whether to allow or permit a more granular action in relation to a cloud service (such as accessing, modifying, downloading or uploading a document or other data, e.g. whether to permit certain data to be copied to a clipboard). As another example, so-called "enterprise" browsers are equipped with a policy engine to enable local policy execution and enforcement at a client device in relation to web applications accessed via the enterprise browser.

SUMMARY

A "hybrid" policy execution mechanism is provided herein. A hybrid policy execution server uses initial context data received from a client device is to partially execute a 'full' policy, resulting in a (simplified) local policy that can be implemented at the client device. The local policy indicates an action and associated local condition that can be evaluated locally at the client device, enabling the client device to determine whether to perform the action in response to a first trigger event without a further call to the hybrid policy execution server. In certain embodiments, the local policy may indicate a call-back condition, which triggers a call-back to the hybrid policy execution server in response to a second trigger event, e.g. with additional context that is now available to the client device. The call-back mechanism can incorporate richer policy conditions, which are not feasible or desirable to evaluate at the client device. Instead, those conditions may be evaluated server-side in response to a call-back from the client device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF FIGURES

Illustrative embodiments will now be described, by way of example only, with reference to the following schematic figures, in which.

DETAILED DESCRIPTION

Figure 1:
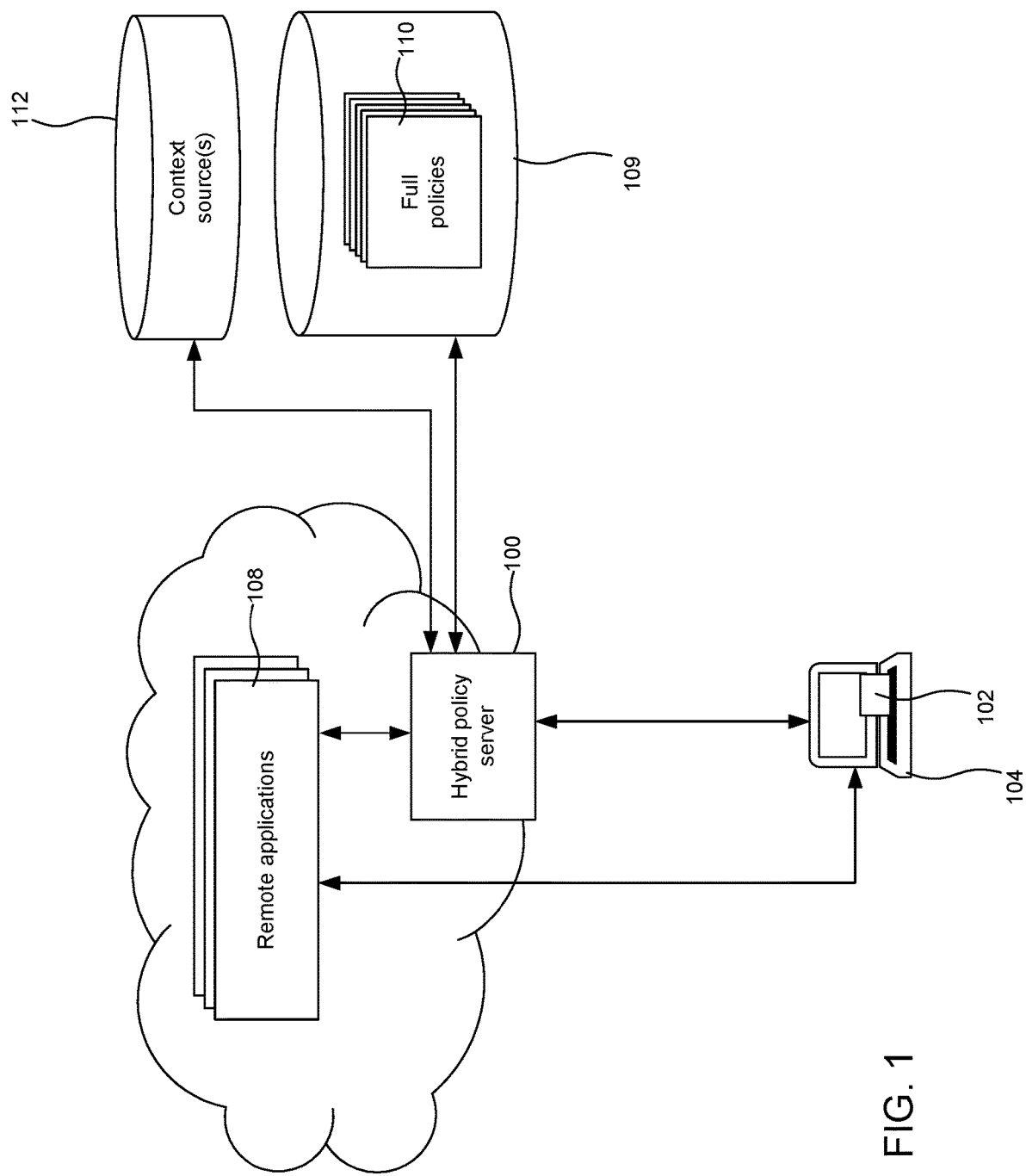
FIG. 1 shows a schematic block diagram of an example networked system.

Existing policy enforcement mechanisms can be broadly divided into 'local' and 'remote' policy execution. With remote policy execution, policies used to regulate actions attempted by a client device are executed remotely from the client device, e.g., at a back-end cloud computing system or proxy service. This approach has various drawbacks, including latency and high network communication overhead. Local policy execution moves policy execution client side. For example, a so-called enterprise browser on a client device might include a policy execution engine, enabling certain policies to be executed and enforced in a web browsing context within the browser itself. However, client-side policy execution capabilities are more limited than their remote execution counterparts, meaning existing local policy execution mechanisms are generally limited to less sophisticated ('lightweight') policies (e.g., with fewer contextual inputs and/or simpler rules with fewer conditions than remote policies). This reduced flexibility can, in turn, have a detrimental impact on user experience, security or both. Moreover, existing mechanisms typically policies to be specifically designed for local execution, often meaning duplication of effort (as remote policy execution would normally still be required in some situations), and additional scope for human error resulting in unintended security vulnerabilities.

By contrast, example embodiments of the present disclosure provide a "hybrid" policy execution mechanism. The hybrid execution mechanism can provide the same level of flexibility as remote execution mechanisms, based on sophisticated ('rich') policies (e.g. with many contextual inputs and/or many conditions) whilst mitigating the problems with remote execution methods such as latency and high communication overhead. Whilst the hybrid execution mechanism does utilize a client-side policy engine, it does not require policies to be specifically designed for client-side execution. Rather, policy execution is distributed between client-side and server-side execution. Among other things, this approach enables an existing policy (e.g., originally designed for remote execution) to be executed in a hybrid fashion, without modification to the existing policy. This, in turn, means less duplication of effort, and therefore less scope for human error. More generally, a sophisticated policy can be defined (e.g., by an organization administrator user) without regard to any client-side policy execution limitations.

Security and compliance use cases require execution of complex policies, often based on significant, quickly changing, context. Context can include information on users, applications, devices and the like. Security operators expect to be able to fine-tune their policies based on context (e.g., to reduce impact on users, administrators, and the operators themselves). The hybrid policy execution approach described herein supports rich policies with context-based filters that allow pinpointing of actions to specific users, devices, applications, and the like, whilst addressing various deficiencies with traditional local and remote policy execution approaches.

Expanding on the above, with existing remote policy execution mechanisms, each time a regulated action is attempted at the client device, this needs to be communicated to a remote policy execution engine, together with a set of contextual inputs, which will typically execute an applicable policy in full (possibly using additional contextual inputs that need to be obtained from elsewhere). This results in a heavy communication load and system fragility, particularly with more sophisticated policies with a large number of contextual inputs and/or a large number of conditions that need to be evaluated. This approach can also introduce significant latency between attempting an action and the action being permitted or blocked, which in turn can significantly impact user experience (e.g., a clipboard copy operation might require a client application to call into a cloud service that introduces a significant delay in an operation that a user might expect to be essentially instantaneous).

In addition to the examples given above, local policy enforcement includes, for example, a browser with ability to enforce policies that turn off/on capabilities in the browser. A remote management server would typically filter and deploy the policies into the client side. As another example, a data loss prevention (DLP) policy might be distributed to a managed client device (managed by an organization) for client-side execution (where the client detects and regulates DLP events).

FIG. 1 shows a highly schematic block diagram of a networked system that supports hybrid policy executions. In hybrid policy execution, a policy is partly executed server-side and partly executed client-side.

As explained below, one implementation uses a "server-client-server" execution model. An initial event at a client device triggers a policy fetch request to a hybrid policy execution server. The policy fetch request includes initial context data, and triggers the selection of an applicability policy (or policies), as well as partial execution of the (or each) applicability policy. In this context, partial execution means evaluating and resolving conditions of the applicable policy based on initial contextual inputs available at that point (the contextual input provided with the policy fetch request, plus any related relevant context that may be available server-side). Generally, it will not be possible to resolve all policy conditions at this point, not least because certain conditions may depend on future context. The result is a simplified local policy (or policies) containing a simpler set of conditions that can be evaluated client-side, which is returned to and cached at the client device. This simplified local policy is generated in response to the local policy request, tailored to the initial context. Certain conditions may be associated with actions that can be performed client-side, whilst other conditions may trigger a call-back to the hybrid policy execution server (possibly with additional context that is now available at the client device when the call-back is triggered). A call-back will trigger further policy execution at the hybrid policy execution server to decide an appropriate action. In the case of a call-back, there is one stage of client-side policy execution and two stages of server-side policy execution: 1) an initial stage of server-side execution to generate the local policy; 2) a client-side local policy execution stage triggered by some client-side event, which in turn triggers a call-back; and 3) a second stage of server-side policy execution to determine an action in response to the call-back.

For example, a full policy relating to a particular service (e.g., web application, cloud service etc.) might have a complex set of conditions, detailing circumstances in which users are permitted to perform file upload and download actions. In response to the initial policy fetch call, it might be possible to fully determine at that point that the client device is not permitted to perform upload actions at all, using only the initial context available at that point. For example, it might be determined that a user identity associated with the client device does not belong to any user group that is permitted to perform upload actions, and this may be considered a relatively static piece of context. In that case, the local policy can simply specify that upload actions are blocked, which does not require any call-back to the hybrid policy execution server. When an upload event is detected client-side, the local policy is executed client-side, resulting in the upload event being blocked.

However, there may be more complex conditions attached to download actions for the user identity in question, whose evaluation requires further context that would not be locally available at the client device at the point a download action is attempted. For example, it might be that downloads are only blocked from certain resources, and it is infeasible or undesirable for the relevant conditions to be evaluated client-side. As another example, it might be that the conditions relating to download events require access to dynamically changing context that is only available server-side, and would not be known at the point the local policy is generated. In such cases, the local policy can specify that any download actions require a call-back to the hybrid policy execution server, with any additional context needed to complete server-side execution of the relevant part of the policy (such as a resource identifier relating to the attempted download). When a download event is detected client-side, the local policy is executed client-side, resulting in a call-back to the hybrid policy execution server to complete execution of the relevant part of the policy.

Certain embodiments consider a local application in the form of an enhanced web browser. Hybrid policy execution is supported by a backend system, which includes a hybrid policy execution server, and has access to rich context source(s). The enhanced browser is equipped with a local policy execution engine. However, the browser is a relatively limited policy execution environment remote from the backend and rich backend context data, and therefore cannot implement a full policy engine needed to implement rich policies. In one use case, the enhanced browser may be installed on an unmanaged client device (not managed by an organization) to enable integration with enterprise security products.

The hybrid policy execution approach means complex parts are executed in the backend and the enhanced browser need only understand a simplified policy model with support for great end user experience.

In this implementation, a hybrid policy execution server filters the policies relevant for the connecting users based on their broad context and returns simplified policies back to the enhanced browser. The browser caches these partially executed policies and uses them to enforce behavior during the user's browsing session. When the cache expires, the browser fetches the polices again based on updated context. In cases where the browser requires more interaction with the hybrid policy execution server (e.g., because there is new data to process such as a file, or because an action needs to be audited), the browser can call again to the hybrid policy execution server in the backend to complete the policy execution.

FIG. 1 shows a schematic block diagram of a networked system comprising a client device 104 and a hybrid policy execution server 100 remote from the client device 104.

The hybrid policy execution server 100 enforces a set of "full" policies 110 stored within a backend system in computer storage 109. The full policies 110 govern access to one or more remote applications 108 (remote from the client device 104), such as web applications, cloud services etc. At the client device 104, the remote applications 108 are accessed via the local application 102 (e.g., web browser). In other implementations, multiple local applications may be installed on the client device 104, via which different remote applications are accessed.

Although not shown in FIG. 1, the hybrid policy execution server 100 comprises at least one processor programmed or otherwise configured to carry out the described functions of the hybrid policy execution server 100 and at least one network interface via which the client device 104 can communicate with the remote applications 108 and the hybrid policy execution server 100.

A local application 102, such as a web browser, is shown executed on the client device 104. Although not shown in FIG. 1, the client device 104 comprises at least one processor programmed or otherwise configured to carry out the described functions of the client device 104 and at least one network interface via which the client device 104 can communicate with the hybrid policy execution server 100 and the remote web applications 108.

The hybrid policy execution server 100 also has access to one or more backend context sources 112, which are sources of context data (such as databases, services, application etc.) that are not available to the local application 102 on the client device 104. The hybrid policy execution server 100 uses the backend context sources 112 to supplement or enrich context provided by the client device 104.

The client device 102 communicates with the hybrid policy execution server 100 and the remote applications 108 via a network, such as the public Internet.

The hybrid policy execution server 100 may be implemented at the hardware level as a server device or a set of multiple server devices (e.g., in a sever pool or multiple server pools).

Figure 2:
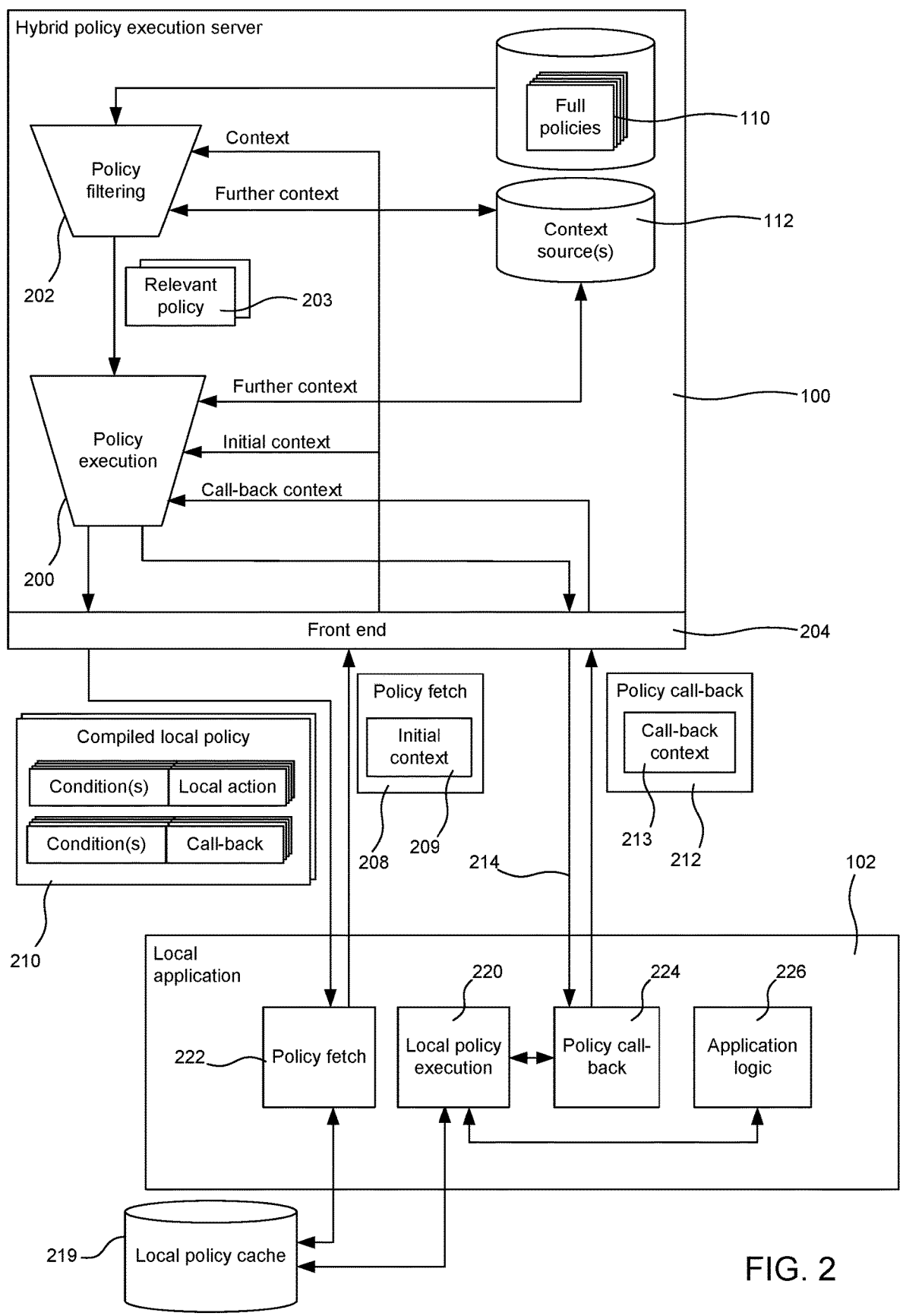
FIG. 2 shows a schematic function block diagram of an example hybrid policy manager supporting an example local application.

FIG. 2 shows a schematic function block diagram of the hybrid policy execution server 100 and the local application 102.

The hybrid policy execution server 100 is shown to comprise a policy execution 200 (referred to as the remote policy execution engine below), a policy filtering engine 202 and a front end 204. The remote policy execution engine 200, policy filtering engine 202 and front end are functional components, which may for example be implemented as code (computer-readable instructions) executed on one or more processors of the hybrid policy execution server 100.

The local application 102 is shown to comprise a policy execution engine 220 (referred to as the local policy execution engine 220 below), in addition to policy fetch logic 222, policy call-back logic 224 and application logic 226. A local policy cache 219 is implemented at the client device 104, which is accessible to the local policy execution engine 220 and the policy fetch logic 222. The local policy cache 219 is a software construct to facilitate temporary storage of data in local computer storage of the client device 104.

The application logic 226 implements core functionality of the application (e.g., requesting and rendering web content). This core function is ultimately regulated by the full policies 110 stored in the back end. To facilitate local policy enforcement, the application logic 226 communicates with the local policy execution engine 220.

The policy fetch logic 222 is responsible for obtaining and caching local policies. Policy fetch logic 222 communicates with the hybrid policy execution server front end 204 for this purpose. A policy request 208 generated by policy fetch logic 222 is shown to comprise initial context data 209, which in turn is used by the hybrid policy execution server 100 to generate a local policy 210. In some cases, multiple local policies may be generated. The local policy 210 is returned to the policy fetch component 222 and stored in the local cache 219. The local policy 210 is stored in association with one or expiration criteria (such as an expiration time), and expires when an expiration criterion is met (e.g., when the expiration time is reached). Once expired, the local policy 210 is no longer valid, and a fresh local policy needs to be fetched.

The initial context data 209 may for example comprise a user identifier (ID) associated with the client device 104, a network address (e.g., IP address) of the client device 104, an application identifier (e.g., identifying one of the remote applications 108, which the client device 104 is attempting to access), and/or a device type of the client device 104 (e.g., 'mobile', 'desktop' etc.).

In response to an event at the client device 104 (e.g., an event communicated to the local policy execution engine 220 by the application logic 226), the local policy execution engine 220 accesses the local policy 210 from the local policy cache 219 and executes the local policy 210 at the client device 104, in order to determine an action in response. The local policy 210 defines both 'local actions' and 'call-backs', where each local action and call back is associated with one or more conditions that can be evaluated locally at the client device 104. A local action's associated condition(s) are evaluated client-side, in order to determine whether to perform the local action. Local actions are 'deterministic' in that the conditions under which they are triggered are fully defined in the local policy 210.

As discussed, in some cases this action can be determined entirely though local policy execution. In other cases, the execution of the local policy 210 may trigger a call-back by the policy call-back logic 224, e.g., with further context that is now available at the client device 104. A call-back's associated conditions are evaluated client-side to determine whether to instigate a call-back. Actions resulting from call-backs are not deterministic in the same way, because those actions depend on policy rules that are not captured in the local policy 210.

A policy call-back request 212 generated by the policy call-back logic 224 is shown, in this example, to comprise call-back context data 213. The policy call-back logic 224 sends the policy call-back request 212 to the hybrid policy execution server front end 204, which returns a call-back response 214. The call back response may indicate an action to be performed which has been determined in the backend. The call-back context data 213 may, for example, comprise an identifier of a resource relating to an event at the client device 104. The call-back context data 213 may also duplicate information contained in the initial context data 209 (e.g., the user ID, network address, application ID and/or device type), if that information is required at the hybrid policy execution server 100 to respond to the call-back request 212.

At the hybrid policy execution server 100, the initial context data 209 in the policy fetch request 208 is used by the policy filtering component 202 to select a relevant policy 203 (or policies) from the set of full policies 110 stored in the backend (policy filtering). The policy filtering may use additional context available in the backend from the backend context source(s) 112.

The remote policy execution engine 200 compiles the local policy 210 via partial execution of the selected policy 203, based on the initial context 209 contained in the policy fetch request 208 and, in some cases, further context available from the backend content source(s) 112. Further server-side policy execution is performed in response to the policy call-back request 212, using the call-back context data 213 (and additional context from the backend context source(s) 112 in some cases). This process of staged server-side policy execution is described in further detail below.

The additional context used to filter and/or execute policies includes, for example, information about user groups or user privileges. Such information may be obtained using a user identifier contained in the initial context data 209 or the call-back context data 213.

Figure 3:
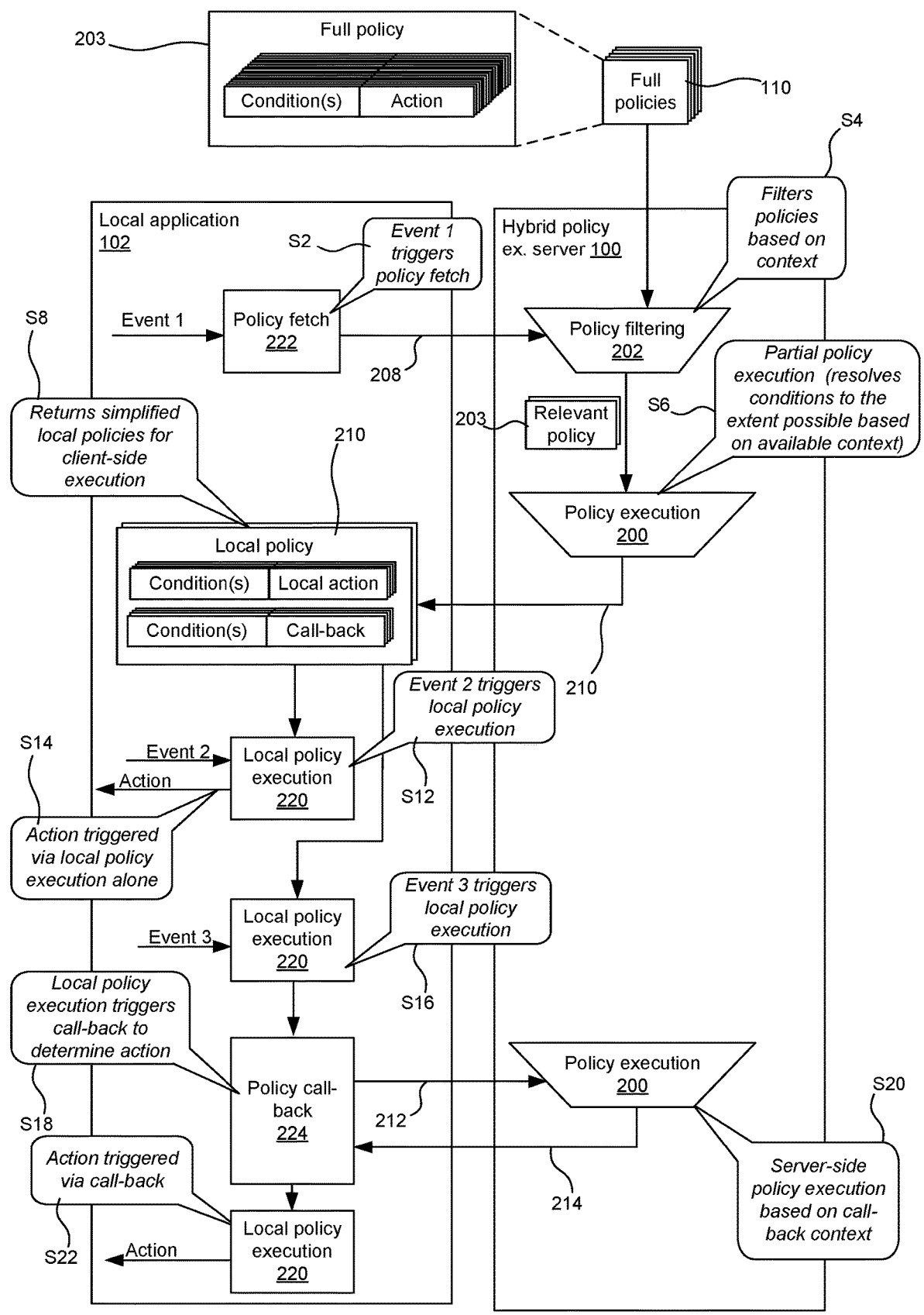
FIG. 3 shows a schematic flow diagram for a method of hybrid policy execution.

FIG. 3 shows a flow diagram for a method of hybrid policy execution performed between the local application 102 and the hybrid policy execution server 100.

At step S2, a first event detected at the local application 102 triggers the policy fetch logic 222 to send the policy fetch request 208 to the hybrid policy execution server 100. For example, the first event may be an initial attempt to access a particular remote application for which no local policy is cached (e.g., because the local application 102 has not attempted to access that remote application before, or it has attempted this previously, but a local policy obtained at that time has expired).

The policy fetch request 208 is received at the hybrid policy execution server 100 and, at step S4, the relevant policy 203 is selected from the set of full policies 110 based on the policy fetch request 208. In some cases, multiple policies may be applicable, and in such cases the following description applies to each selected policy.

At step S6, the policy execution engine 200 partially executes the selected policy 203. The selected policy 203 is a full policy, containing a potentially large number of conditions associated with possible actions, as depicted towards the top of FIG. 3. During this partial execution process, these conditions are evaluated and resolved to the extent possible based on the initial context data 209 contained in the request, and any additional relevant context available in the backend at that point in time. Context that is relatively unlikely to change within the local policy expiration period can be treated as static at this point, and used in the partial execution of the policy. For example, if a user identifier contained in the initial context data 209 is associated with a certain user group or has certain privileges, in some cases these may be assumed to be static, and used to resolve conditions of the selected policy 203. By resolving as many conditions as possible at this point, it is possible to compile the simpler local policy 210, which, as noted, has first conditions associated with actions and second conditions associated with call-backs.

At step S8, the hybrid policy execution server 100 returns the local policy 210 to the local application, which caches the local policy 210 at the client device 104.

At step S12, the local policy execution engine 220 executes the local policy 210 in response to a second event at the local application 102. In this case, the second event is such that the local policy execution engine 220 is able to fully determine (step S14) an action in response to the second event through local policy execution alone, and thus cause the application to be implemented without any call-back to the hybrid policy execution server 100. In other words, the local policy execution engine 220 determines that the second event satisfies a condition or set of conditions associated with an action in the local policy 210.

At step S16 (which could be before, after or simultaneous with step S12), the local policy execution engine 220 executes the local policy 210 in response to a third event. The third event is such that an action cannot be determined through local policy execution alone, but requires a call-back. In other words, the local policy execution engine determines (S16) that the second event satisfies a condition or set of conditions associated with a call-back in the local policy 210. Where applicable, call-back context data 213 can be determined based on the second event for inclusion in the call-back request 212 (such as a resource identifier, in the case of a resource access event). For example, the call-back context data 213 may indicate the third event that triggered the call-back.

In response, at step S18, the policy call-back logic 224 instigates the policy call-back request 212 to the hybrid policy execution server 100.

At step S20, the remote policy execution engine resumes execution of the selected policy 203. Using the call-back context 213 contained in the call-back request 212 (if included) and/or additional context that is now available in the backend, the remote policy execution engine 200 is now able to complete execution of the selected policy 203 (meaning it is able to evaluate and resolve all relevant condition(s) needed to determine an action in response to the third event). In the present example, the full policy execution of step S20 is implemented by repeating the filtering step of S4 and the execution step of S6 'from scratch', but now with the additional call-back context 213 that enables full (rather than partial) policy execution at step S20. To enable full policy filtering/execution in this scenario, the call-back context 213 may duplicate the initial context 209 contained in the policy fetch request, as well as providing additional context available at the point of call back. This means that no server-side policy caching is required and the hybrid policy execution server 100 is not required to retain state pertaining to the earlier partial policy execution at step S6.

The hybrid policy execution server 100 communicates the action determined at step S20 back to the local policy execution engine 220, which causes the action to be implemented at step S22.

Figure 4:
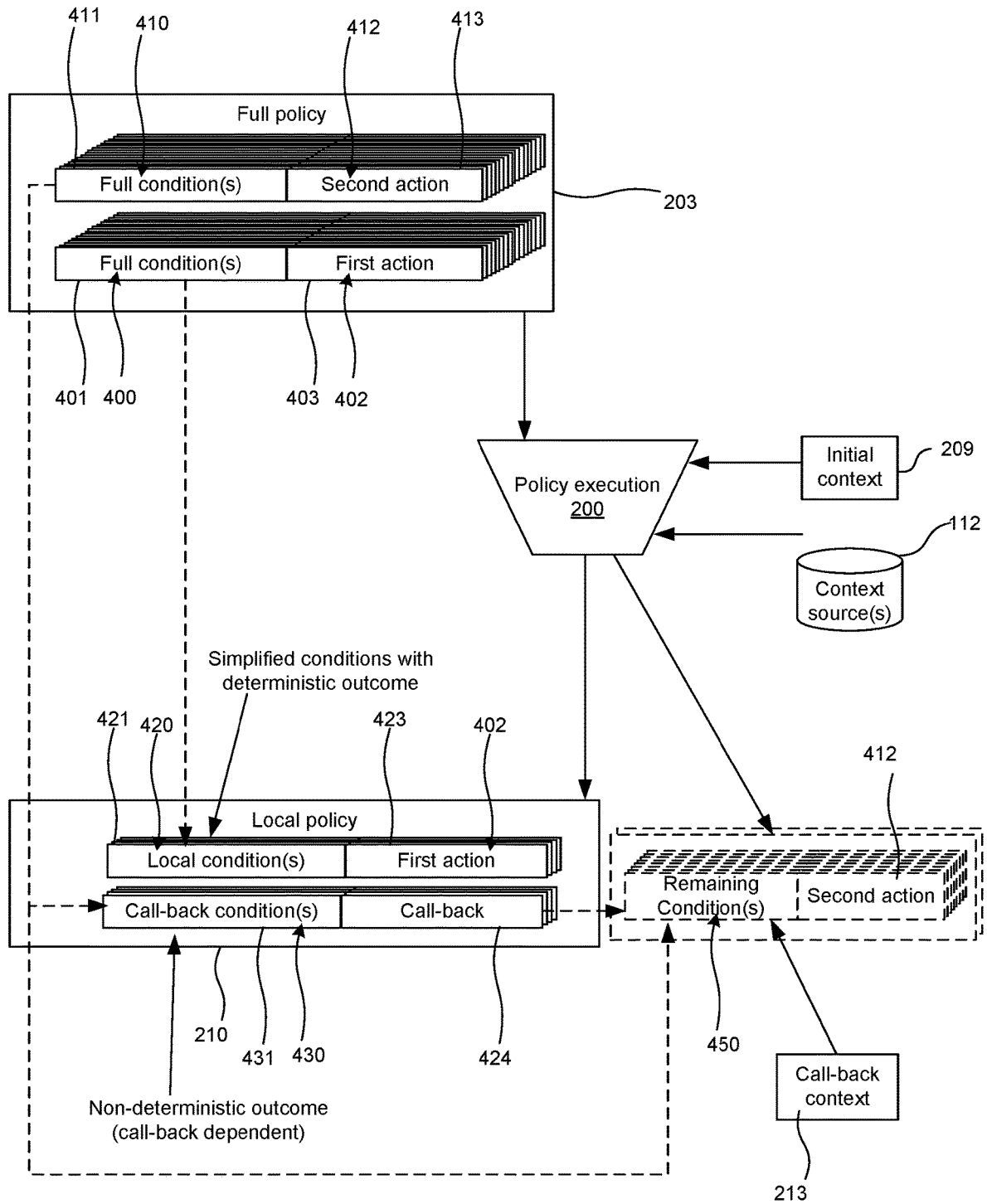
FIG. 4 illustrates certain principles of local policy generation.

FIG. 4 further illustrates the relationship between the full policy 203 and the local policy 210 that is compiled via partial execution of the full policy 203.

The full policy 203 defines actions and condition(s), and a set of complex (rich) condition(s) may be associated with a given action. It would not necessarily be feasible to evaluate a 'full' set of condition(s) of this nature in a limited client-side policy execution environment.

In the example of FIG. 4, the full policy 203 is shown to comprise a first action indicator 401 and a first condition indicator 403 associated with the first action indicator 403. The first action indicator 403 indicates a first action 402. The first condition indicator 401 indicates a first set of 'full' condition(s) 400 associated with the first action 402 in the full policy 203. The full policy 203 additionally comprises a second action indicator 413, which indicates a second action 412, and a second condition indicator 411, which is associated with the second action indicator 413 and indicates a second set of full condition(s) 410 associated with the second action 412 in the full policy 203. An indicator refers to a portion or portions of policy data in this context.

In some cases, it may be possible to reduce a set of full condition(s) to a set of simplified, local condition(s) that can be evaluated client-side, using the initial context data 209 and any relevant server-side context available at that point. In the example of FIG. 4, it is possible to reduce the first set of full condition(s) 400 in this way, resulting in a first set of simplified local condition(s) 420 that is associated in the local policy 210 with the first action 402. The set of full condition(s) is said to be 'resolved' when it is reduced to a set of simplified condition(s) that can be evaluated client-side to determine whether to perform the local action (without a call-back to the hybrid policy execution server 100).

The local policy 210 comprises a first local action indicator 431 indicating the first action 402 and a first local condition indicator 421 indicating the first set of local condition(s) 420. Because the first set of local condition(s) 420 is associated with the first action 402 in the local policy 210, it is deterministic in its outcome: those local condition(s) 420 indicated in the local policy 210 fully determine when the first action 402 is performed.

In the example of FIG. 4, it is not possible to reduce the second set of condition(s) 410 in this manner using the initial context data 209. In other words, the initial context data 209 is insufficient to resolve the second set of condition(s) 410 in the above sense. Therefore, instead, a set of call-back condition(s) 430 is determined and indicated by a call-back condition indicator 431 included in the local policy 210. Those condition(s) are not deterministic in their outcome. Rather, they trigger a call-back to the hybrid policy execution server 100, as there are remaining condition(s) 450 that will need to be evaluated server-side to determine whether to perform the second action 412. The local policy 210 comprises a call-back indicator 424 associated with the call-back indicator 431. The call-back indicator 424 indicates that a call back is required when the set of call-back condition(s) 430 is satisfied. To determine whether to perform the second action 412 in response to a call back, the hybrid policy execution server 100 performs policy filtering and execution from scratch, using the additional call-back context 213 provided by the client device 104 at that point. In executing the full policy 203 based on the call-back context data 213, the hybrid policy execution server 100 may determine that the call-back context data 213 satisfies the second set of full condition(s) 410 associated with the second action 412. In that event, the hybrid policy execution server 100 causes the client device 104 to perform the second action 412. For example, the call-back context data 213 might comprise (among other things) a user identifier and an indication of an event which triggered the call-back. The hybrid policy execution server 100 may determine (though full policy execution) that the event in question should be blocked for the identified user.

As noted, a benefit of the hybrid approach described above is that it does not require bespoke client-side policies to be designed. Among other things, this means that a common set of policies can be used to support both hybrid policy execution and traditional remote policy execution (e.g. for legacy client devices or browsers).

Figure 5:
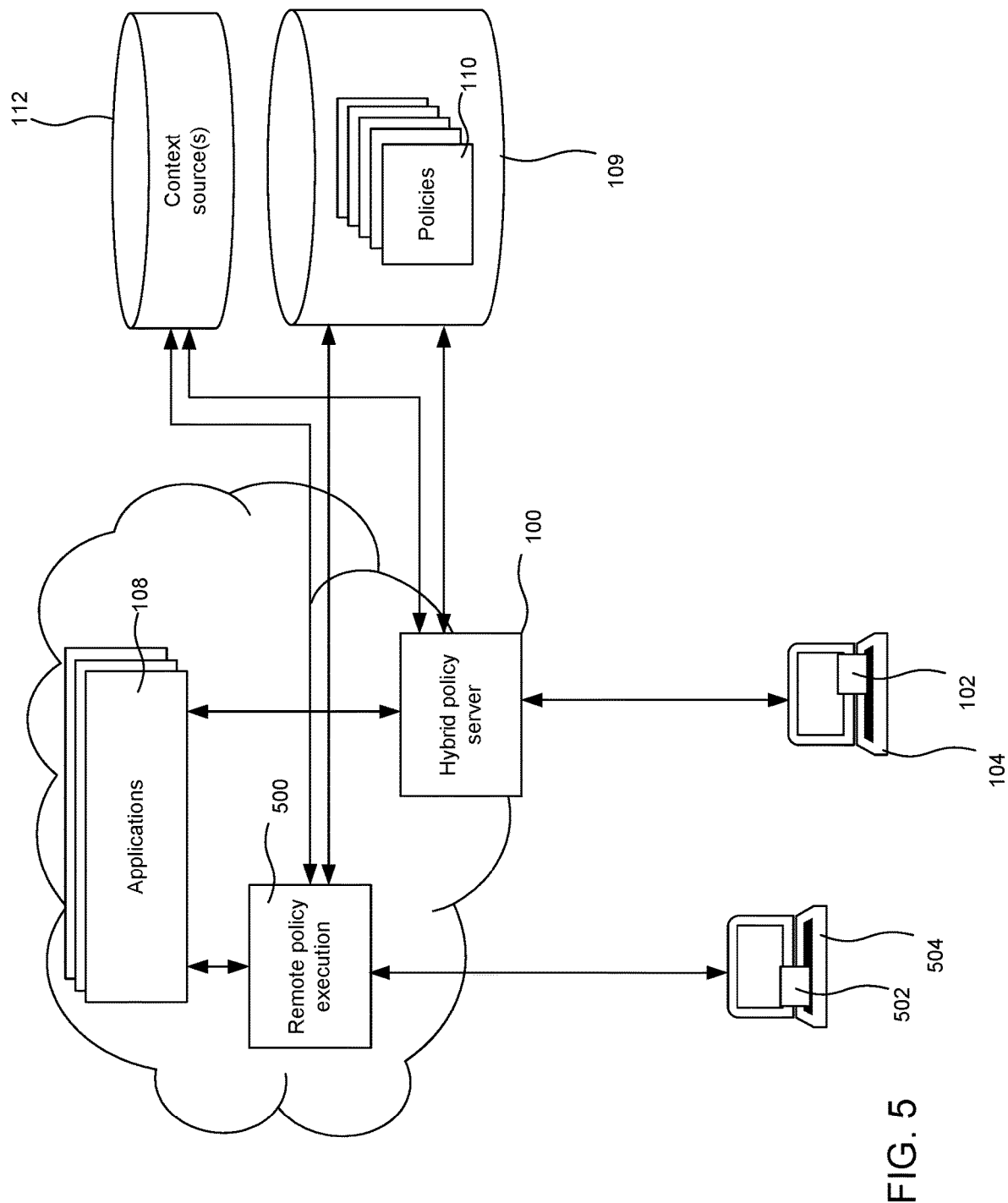
FIG. 5 shows a schematic block diagram of an example networked system supporting both hybrid policy execution and remote policy execution based on a common set of policies.

FIG. 5 shows an extended networked system, which corresponds to the system of FIG. 1, but with the addition of a remote policy execution server 500 that applies the same set of policies 110 as the hybrid policy execution server 100, and has access to the same context source(s) 112. A second client device 504 is shown executing a second client application 502, e.g., a second type of web browser that is not equipped with any local policy execution engine (to distinguish from the second client device 504, the client device 104 of FIG. 1 is referred to as the first client device 104 below). The remote policy execution server 500 performs remote (server-side) policy execution to select and enforce the policies 110 server-side, requiring the second client device 504 to call the remote policy execution server 500 each and every time a regulated action is attempted at the second device 504. By contrast, the hybrid policy execution server 100 generates a simplified local policy (or policies), though filtering and partial execution of those same policies 110, and returns the simplified local policy or policies to the first client device 102, enabling the first client device 104 to decide a response to certain regulated actions, without making a further call to the hybrid policy execution server 100, though local policy execution alone.

Figure 6:
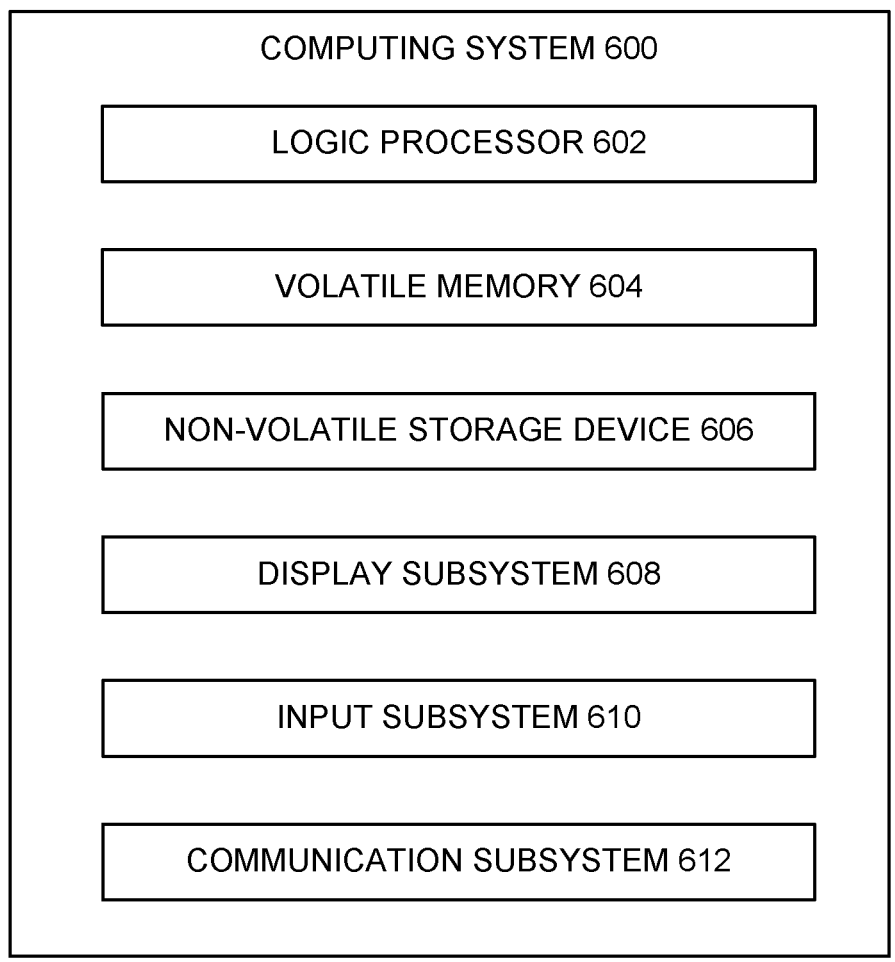
FIG. 6 shows a schematic block diagram of an example computer system.

FIG. 6 schematically shows a non-limiting example of a computing system 600, such as a computing device or system of connected computing devices, that can enact one or more of the methods or processes described above, including the filtering of data and implementation of the structured knowledge base described above. Computing system 600 is shown in simplified form. Computing system 600 includes a logic processor 602, volatile memory 604, and a non-volatile storage device 606. Computing system 600 may optionally include a display subsystem 608, input subsystem 610, communication subsystem 612, and/or other components not shown in FIG. 6. Logic processor 602 comprises one or more physical (hardware) processors configured to carry out processing operations. For example, the logic processor 602 may be configured to execute instructions that are part of one or more applications, programs, routines, libraries, objects, components, data structures, or other logical constructs. The logic processor 602 may include one or more hardware processors configured to execute software instructions based on an instruction set architecture, such as a central processing unit (CPU), graphical processing unit (GPU) or other form of accelerator processor. Additionally or alternatively, the logic processor 602 may include a hardware processor(s)) in the form of a logic circuit or firmware device configured to execute hardware-implemented logic (programmable or non-programmable) or firmware instructions. Processor(s) of the logic processor 602 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 602 may be virtualized and executed by remotely accessible, networked computing devices configured in a cloud-computing configuration. In such a case, these virtualized aspects are run on different physical logic processors of various different machines. Non-volatile storage device 606 includes one or more physical devices configured to hold instructions executable by the logic processor 602 to implement the methods and processes described herein. When such methods and processes are implemented, the state of non-volatile storage device 606 may be transformed—e.g., to hold different data. Non-volatile storage device 606 may include physical devices that are removable and/or built-in. Non-volatile storage device 606 may include optical memory (e g., CD, DVD, HD-DVD, Blu-Ray Disc, etc.), semiconductor memory (e g., ROM, EPROM, EEPROM, FLASH memory, etc.), and/or magnetic memory (e.g., hard-disk drive), or other mass storage device technology. Non-volatile storage device 606 may include nonvolatile, dynamic, static, read/write, read-only, sequential-access, location-addressable, file-addressable, and/or content-addressable devices. Volatile memory 604 may include one or more physical devices that include random access memory. Volatile memory 604 is typically utilized by logic processor 602 to temporarily store information during processing of software instructions. Aspects of logic processor 602, volatile memory 604, and non-volatile storage device 606 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" may be used to describe an aspect of computing system 600 typically implemented in software by a processor to perform a particular function using portions of volatile memory, which function involves transformative processing that specially configures the processor to perform the function. Thus, a module, program, or engine may be instantiated via logic processor 602 executing instructions held by non-volatile storage device 606, using portions of volatile memory 604. Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc. When included, display subsystem 608 may be used to present a visual representation of data held by non-volatile storage device 606. The visual representation may take the form of a graphical user interface (GUI). As the herein-described methods and processes change the data held by the non-volatile storage device, and thus transform the state of the non-volatile storage device, the state of display subsystem 608 may likewise be transformed to visually represent changes in the underlying data. Display subsystem 608 may include one or more display devices utilizing virtually any type of technology. Such display devices may be combined with logic processor 602, volatile memory 604, and/or non-volatile storage device 606 in a shared enclosure, or such display devices may be peripheral display devices. When included, input subsystem 610 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 612 may be configured to communicatively couple various computing devices described herein with each other, and with other devices. Communication subsystem 612 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the internet. The term computer readable media as used herein may include computer storage media. Computer storage media may include volatile and non-volatile, removable and nonremovable media (e.g., volatile memory 604 or non-volatile storage 606) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 600 or a component device thereof). Computer storage media does not include a carrier wave or other propagated or modulated data signal. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

A first aspect herein provides a hybrid policy execution server comprising: at least one network interface; at least one memory configured to store computer-readable instructions; and at least one processor coupled to the at least one network interface and the at least one memory, and configured to execute the computer-readable instructions, which are configured upon execution to cause the at least one processor to: receive from a client device a policy fetch request comprising initial context data, access from computer storage a full policy comprising an action indicator indicating an action and a condition indicator associated with the action indicator, the condition indicator indicating a condition, determine a local condition based on the condition indicator and the initial context data, generate a local policy comprising a local action indicator indicating the action and a local condition indicator associated with the local action indicator, the local condition indicator indicating the local condition, and transmit the local policy to the client device in response to the policy fetch request.

In embodiments, transmitting the local policy to the client device may cause the client device to: determine, responsive to a first event at the client device, that the first event satisfies the local condition, and perform the action in response.

Performing the first action may comprise blocking the first event.

The first event may, for example, be: an attempted access of an application, resource, service or file, a data modification or deletion attempt, a file upload or download event, or an attempted clipboard operation.

The full policy may comprise a second action indicator indicating a second action and a second condition indicator associated with the second action indicator, the second condition indicator indicating a second condition. The computer-readable instructions may be configured to cause the at least one processor to: determine that the initial context data is insufficient to resolve the second condition, and responsive to determining that the initial context data is insufficient to resolve the second condition, determine a call-back condition relating to the second action, wherein the local policy comprises a call-back condition indicator indicating the call-back condition.

The computer-readable instructions may be configured to cause the at least one processor to: receive from the client device a call-back request comprising call-back context data; determine that the call-back context data satisfies the second condition, responsive to determining that the call-back context data satisfies the second condition, cause the client device to perform the second action.

The call-back context data may indicate a second event that triggered the call-back request, and performing the second action may comprise blocking the second event.

The second event may, for example, be: an attempted access of an application, resource, service or file, a data modification or deletion attempt, a file upload or download event, or an attempted clipboard operation.

The full policy may be accessed using the initial context data.

The policy fetch request may be received from a browser application executed on the client device.

The location condition may be determined based on additional context data, the additional context data obtained using the initial context data.

A second aspect herein provides a client device comprising: at least one network interface; at least one memory configured to store computer-readable instructions; and at least one processor coupled to the at least one network interface and the at least one memory, and configured to execute the computer-readable instructions, which are configured upon execution to cause the at least one processor to: determine initial context data associated with the client device; transmit to a hybrid policy execution server a policy fetch request comprising the initial context data, receive from the hybrid policy execution server in response to the policy fetch request a local policy comprising: a local condition indicator indicating a local condition, a local action indicator associated with the local condition indicator, the local action indicator indicating a first action, and a call-back condition indicator indicating a call-back condition, responsive to a first event, determine that the first event satisfies the local condition, responsive to determining that the first event satisfies the local condition, triggering the first action in response, responsive to a second event, determine that the second event satisfies the call-back condition, responsive to determining that the second event satisfies the call-back condition, transmit a call-back request to the hybrid policy execution server, receive from the hybrid policy execution server in response to the call-back request, a response indicating a second action, and trigger the second action.

The initial context data may comprise a user identifier, a network address, an application identifier, or a device type.

The computer-readable instructions may be configured to cause the at least one processor to: determine call-back context data based on the second event, wherein the call-back request comprises call-back context data.

The call-back context data may indicate the second event.

Triggering the first action may comprise blocking the first event.

The first event may be: an attempted access of an application, resource, service or file, a data modification or deletion attempt, a file upload or download event, or an attempted clipboard operation.

Triggering the second action may comprise blocking the second event.

The second event may be: an attempted access of an application, resource, service or file, a data modification or deletion attempt, a file upload or download event, or an attempted clipboard operation.

A computer-readable storage medium configured to store computer-readable instructions, the computer-readable instructions configured, upon execution of at least one processor of a client device, to cause the client device to: determine initial context data associated with the client device; transmit to a hybrid policy execution server a policy fetch request comprising the initial context data, receive from the hybrid policy execution server in response to the policy fetch request a local policy comprising: a local condition indicator indicating a local condition, a local action indicator associated with the local condition indicator, the local action indicator indicating a first action, and a call-back condition indicator indicating a call-back condition, responsive to a first event, determine that the first event satisfies the local condition, responsive to determining that the first event satisfies the local condition, trigger the first action in response, responsive to a second event, determine that the second event satisfies the call-back condition, responsive to determining that the second event satisfies the call-back condition, transmit a call-back request to the hybrid policy execution server, receive from the hybrid policy execution server in response to the call-back request, a response indicating a second action, and trigger the second action.

It will be appreciated that the above embodiments have been disclosed by way of example only. Other variants or use cases may become apparent to a person skilled in the art once given the disclosure herein. The scope of the present disclosure is not limited by the above-described embodiments, but only by the accompanying claim.

The invention claimed is:

1. A hybrid policy execution server comprising:
   a network interface;
   a memory configured to store computer-readable instructions; and
   a processor coupled to the network interface and the memory, and configured to execute the computer-readable instructions, which are configured upon execution to cause the processor to:
      receive from a client device a policy fetch request comprising initial context data, the initial context data comprising a user identifier, a network address, an application identifier, or a device type;

access from computer storage a full policy for remote execution comprising an action indicator indicating a first action and a condition indicator, the condition indicator indicating a condition;

partially resolve the full policy on the hybrid policy execution server, comprising resolving the condition of the full policy based on the initial context data;

determine a local condition based on the condition indicator and the initial context data;

based on the resolved condition of the full policy, generate, on the hybrid policy execution server, a local policy, the local policy being based on the initial context data and containing a simplified policy condition remaining after partially resolving the full policy, the local policy further comprising an evaluation of the simplified policy condition; and transmit the local policy to the client device in response to the policy fetch request, wherein transmitting the local policy to the client device causes the client device to:

perform the first action based on a first event satisfying the local condition, transmit a call-back request to the hybrid policy execution server based on a second event satisfying a call-back condition, based on the call-back request, receive from the hybrid policy execution server a response indicating a second action, and perform the second action.

2. The hybrid policy execution server of claim 1, wherein partially resolving the full policy on the hybrid policy execution server, performing the first action, and performing the second action completely executes the full policy.

3. The hybrid policy execution server of claim 1, wherein performing the first action or the second action comprises blocking the first event.

4. The hybrid policy execution server of claim 3, wherein the first event is:
an attempted access of an application, resource, service or file;
a data modification or deletion attempt;
a file upload or download event; or
an attempted clipboard operation.

5. The hybrid policy execution server of claim 1, wherein the computer-readable instructions are configured to cause the processor to:
determine that the initial context data is insufficient to resolve a second condition; and
responsive to determining that the initial context data is insufficient to resolve the second condition, determine a second call-back condition relating to a third action, wherein the second call-back condition comprises a trigger for further policy resolution at the hybrid policy execution server to determine an action.

6. The hybrid policy execution server of claim 5, wherein the computer-readable instructions are configured to cause the processor to:
receive from the client device a second call-back request comprising call-back context data;
determine that the call-back context data satisfies the second condition; and
responsive to determining that the call-back context data satisfies the second condition, cause the client device to perform the third action.

7. The hybrid policy execution server of claim 6, wherein the call-back context data indicates a third event that triggered the call-back request, and performing the second action comprises blocking the third event.

8. The hybrid policy execution server of claim 7, wherein the third event is:
an attempted access of an application, resource, service or file;
a data modification or deletion attempt;
a file upload or download event; or
an attempted clipboard operation.

9. The hybrid policy execution server of claim 1, wherein the full policy is accessed using the initial context data.

10. The hybrid policy execution server of claim 1, wherein the policy fetch request is received from a browser application executed on the client device.

11. The hybrid policy execution server of claim 1, wherein;
a location condition is determined based on additional context data, and
the additional context data is obtained using the initial context data.

12. A client device comprising:
a network interface;
a memory configured to store computer-readable instructions; and
a processor, coupled to the network interface and the memory, configured to execute the computer-readable instructions, the computer-readable instructions being configured upon execution to cause the processor to:
determine initial context data associated with the client device, the initial context data comprising a user identifier, a network address, an application identifier, or a device type;
transmit to a hybrid policy execution server a policy fetch request comprising the initial context data;
receive from the hybrid policy execution server in response to the policy fetch request a local policy, the local policy being based on partially resolving, on the hybrid policy execution server, a full policy for remote execution accessed from a computer storage of the hybrid policy execution server, the partially resolving comprising resolving a condition of the full policy based on the initial context data, and
the local policy being generated, on the hybrid policy execution server, based on the resolved condition of the full policy and the initial context data, the local policy containing a simplified policy condition remaining after partially resolving the full policy, the local policy further comprising an evaluation of the simplified policy condition, responsive to a first event, determining that the first event satisfies a local condition;
perform a first action based on a first event satisfying the local condition;
transmit a call-back request to the hybrid policy execution server based on a second event satisfying a call-back condition;
based on the call-back request, receive from the hybrid policy execution server a response indicating a second action; and
perform the second action.

13. The client device of claim 12, wherein policy filtering comprises applying at least one of the first action or the second action to at least one of a user, a specific device or a specific application.

14. The client device of claim 13, wherein the computer-readable instructions are further configured to cause the processor to:
  determine call-back context data based on the second event, wherein the call-back request comprises call-back context data.

15. The client device of claim 14, wherein the call-back context data indicates the second event.

16. The client device of claim 12, wherein triggering the first action comprises blocking the first event.

17. The client device of claim 16, wherein the first event is:
  an attempted access of an application, resource, service or file;
  a data modification or deletion attempt;
  a file upload or download event; or
  an attempted clipboard operation.

18. The client device of claim 12, wherein triggering the second action comprises blocking the second event.

19. The client device of claim 18, wherein the second event is:
  an attempted access of an application, resource, service or file;
  a data modification or deletion attempt;
  a file upload or download event; or
  an attempted clipboard operation.

20. A computer-readable storage medium configured to store computer-readable instructions, the computer-readable instructions configured, upon execution of a processor of a client device, to cause the client device to:
  determine initial context data associated with the client device, the initial context data comprising a user identifier, a network address, an application identifier, or a device type;
  transmit to a hybrid policy execution server a policy fetch request comprising the initial context data;
  receive from the hybrid policy execution server in response to the policy fetch request a local policy,
    the local policy being based on partially resolving, on the hybrid policy execution server, a full policy for remote execution accessed from a computer storage of the hybrid policy execution server, the partially resolving comprising resolving a condition of the full policy based on the initial context data, and
    the local policy being generated, on the hybrid policy execution server, based on a resolved condition of the full policy and the initial context data the local policy containing a simplified policy condition remaining after partially resolving the full policy, the local policy further comprising an evaluation of the simplified policy condition; and
  perform a first action based on a first event satisfying a local condition;
  transmit a call-back request to the hybrid policy execution server based on a second event satisfying a call-back condition;
  based on the call-back request, receive from the hybrid policy execution server a response indicating a second action; and
  perform the second action.

* * * * *